(12) United States Patent
Yacobi et al.

(10) Patent No.: US 7,681,039 B2
(45) Date of Patent: **\*Mar. 16, 2010**

(54) COLLUSION-RESISTANT WATERMARKING AND FINGERPRINTING

(75) Inventors: Yacov Yacobi, Mercer Island, WA (US); Henrique Malvar, Redmond, WA (US); Darko Kirovski, Bellevue, WA (US)

(73) Assignee: Microsoft Corporation, Redmond, WA (US)

( \* ) Notice: Subject to any disclaimer, the term of this patent is extended or adjusted under 35 U.S.C. 154(b) by 922 days.

This patent is subject to a terminal disclaimer.

(21) Appl. No.: 10/975,514

(22) Filed: Oct. 28, 2004

(65) Prior Publication Data

US 2005/0086485 A1    Apr. 21, 2005

Related U.S. Application Data

(63) Continuation of application No. 09/841,159, filed on Apr. 23, 2001, now Pat. No. 7,047,413.

(51) Int. Cl.
*H04L 9/32* (2006.01)
(52) U.S. Cl. .................................................. 713/176
(58) Field of Classification Search ........................ None
See application file for complete search history.

(56) References Cited

U.S. PATENT DOCUMENTS 5,313,633 A    5/1994    Tomita et al.

(Continued)

FOREIGN PATENT DOCUMENTS

EP        0951183        10/1999

(Continued)

OTHER PUBLICATIONS

Finnigan, et al., "The software bookshelf", retrieved from <<http://www.research.ibm.com/journal/sj364/finnigan.txt>>, IBM 1997 39 pages.

(Continued)

*Primary Examiner*—Benjamin E Lanier
(74) *Attorney, Agent, or Firm*—Lee & Hayes, PLLC

(57) ABSTRACT

An implementation of a technology is described herein that facilitates rights enforcement of digital goods using watermarks. More particularly, it is a fingerprinting technology for protecting digital goods by detecting collusion as a malicious attack and identifying the participating colluders. If a digital pirate breaks one client and enables this client to avoid watermark detection, all content (both marked/protected an unmarked/free) can be played as unmarked only on that particular client. However, to enable other clients to play content as unmarked, the digital pirate needs to collude the extracted detection keys from many clients in order to create content that can evade watermark detection on all clients. The described implementation significantly improves collusion resistance through a fingerprinting mechanism that can identify the members of a malicious coalition even when their numbers are several orders of magnitude greater than what conventional collusion-protection schemes can accomplish. However, in this scenario each member of the malicious coalition leaves a fingerprint in every digital good from which the estimated watermark is subtracted. Thus, like a burglar without gloves, the digital pirate leaves her fingerprints only when she commits a crime. This abstract itself is not intended to limit the scope of this patent. The scope of the present invention is pointed out in the appending claims.

18 Claims, 5 Drawing Sheets

U.S. PATENT DOCUMENTS

| | | |
|---|---|---|
| 5,345,586 A | 9/1994 | Hamala et al. |
| 5,566,333 A | 10/1996 | Olson et al. |
| 5,581,737 A | 12/1996 | Dahlen et al. |
| 5,665,018 A | 9/1997 | Miyata |
| 5,692,129 A | 11/1997 | Sonderegger et al. |
| 5,802,511 A | 9/1998 | Kouchi et al. |
| 5,812,134 A | 9/1998 | Pooser et al. |
| 5,859,978 A | 1/1999 | Sonderegger et al. |
| 5,875,446 A | 2/1999 | Brown et al. |
| 5,930,369 A | 7/1999 | Cox et al. |
| 5,970,496 A | 10/1999 | Katzenberger |
| 5,987,471 A | 11/1999 | Bodine et al. |
| 5,999,911 A | 12/1999 | Berg et al. |
| 6,016,499 A | 1/2000 | Ferguson |
| 6,064,764 A | 5/2000 | Bhaskaran et al. |
| 6,101,602 A | 8/2000 | Fridrich |
| 6,199,059 B1 | 3/2001 | Dahan et al. |
| 6,219,053 B1 | 4/2001 | Tachibana et al. |
| 6,223,145 B1 | 4/2001 | Hearst |
| 6,243,480 B1 | 6/2001 | Zhao et al. |
| 6,285,366 B1 | 9/2001 | Ng et al. |
| 6,289,382 B1 | 9/2001 | Bowman-Amuah |
| 6,317,749 B1 | 11/2001 | Ghatate |
| 6,345,100 B1 | 2/2002 | Levine |
| 6,345,104 B1 | 2/2002 | Rhoads |
| 6,434,564 B2 | 8/2002 | Ebert |
| 6,442,557 B1 | 8/2002 | Buteau et al. |
| 6,463,420 B1 | 10/2002 | Guidice et al. |
| 6,489,970 B1 | 12/2002 | Pazel |
| 6,523,040 B1 | 2/2003 | Lo et al. |
| 6,535,884 B1 | 3/2003 | Thornton et al. |
| 6,556,984 B1 | 4/2003 | Zien |
| 6,564,263 B1 | 5/2003 | Bergman et al. |
| 6,564,370 B1 | 5/2003 | Hunt |
| 6,636,250 B1 | 10/2003 | Gasser |
| 6,643,652 B2 | 11/2003 | Helgeson et al. |
| 6,708,161 B2 | 3/2004 | Tenorio et al. |
| 6,721,758 B1 | 4/2004 | Jex et al. |
| 6,754,666 B1 | 6/2004 | Brookler et al. |
| 6,754,822 B1 * | 6/2004 | Zhao .......................... 713/176 |
| 6,785,667 B2 | 8/2004 | Orbanes et al. |
| 6,807,634 B1 | 10/2004 | Braudaway et al. |
| 6,810,429 B1 | 10/2004 | Walsh et al. |
| 6,859,217 B2 | 2/2005 | Robertson et al. |
| 6,901,515 B1 | 5/2005 | Muratani |
| 6,938,046 B2 | 8/2005 | Cooke et al. |
| 6,957,230 B2 | 10/2005 | Cameron et al. |
| 2001/0034733 A1 | 10/2001 | Prompt et al. |
| 2001/0047385 A1 | 11/2001 | Tuatini |
| 2002/0009208 A1 | 1/2002 | Alattar et al. |
| 2002/0012445 A1 | 1/2002 | Perry |
| 2002/0046211 A1 | 4/2002 | Fragapane et al. |
| 2002/0083048 A1 | 6/2002 | Tenorio et al. |
| 2002/0169744 A1 | 11/2002 | Cooke et al. |
| 2002/0191809 A1 | 12/2002 | Kirovski et al. |
| 2003/0088654 A1 | 5/2003 | Good et al. |
| 2004/0002982 A1 | 1/2004 | Ersek et al. |
| 2004/0143742 A1 | 7/2004 | Muratani |

FOREIGN PATENT DOCUMENTS

WO     WO 97/34391     9/1997

OTHER PUBLICATIONS

Baeza-Yates et al., "New Approaches to Information Management: Attribute-Centric Data Systems", String Processing and Information Retrieval, 2000. Spire 2000. Proceedings. Seventh International Symposium on Sep. 27-29, 2000. Piscataway, NJ, USA, IEEE, Sep. 27, 2000, pp. 17-27.

Furnas et al, "Multitrees: Enriching and Reusing Hierarchical Structure", 1994. Hum Factors Comput Syst; Conference Proceedings on Human Factors in Computing Systems; Celebrating Independence 1994. Published by ACM. New York, NY, USA, pp. 330-336.

Yamamoto, et al., "A Method of Image Watermarking which can Detect All Illegal Users in Collusion", retrieved on 1998 Symposium on Cryptography and Information Security, Hammanako, Japan, Jan. 28-31, 1998, English Language Translation, pp. 08.

"A Summary of the X.500(96) User Schema for use with LDAPv3" The Internet Society Dec. 1997 20 pages.

"Information Technology—Open Systems Interconnection—The Directory: The Models" Recommendation X.501 ISO/IEC 9594-2 Feb. 14, 1993 164 pages.

Biron et al. (www.w3.org) discloses as "XML Schema Part 2: Datatypes" W3C Recommendations May 2, 2001 pp. 1-21.

Chita, Christian, "Hierarchy Visualization" Publication retrieved from the Internet in May 2004 http://www.cs.ubc.ca/tmm/courses/cpsc533c-04-spr/slides/0331.cchita2.6up.pdf.

Howes, "The LDAP URL Format" The Internet Society, Dec. 1997, 8 pages.

Howes, "The String Representation of LDAP Search Filters" The Internet Society 8 pages.

Melbourne, "The Directory—Overview of Concepts Models and Services" 1988 47 pages.

Wahl, "Lightweight Directory Access Protocol (v3): Attribute Syntax Definitions" The Internet Society Dec. 1997 32 pages.

Wahl, M., "Lightweight Directory Access Protocol (v3): UTF-8 String Representation of Distinguished Names" The Internet Society 10 pages.

Wahl et al., "Lightweight Directory Access Protocol (v3)" Internet Society Dec. 1997 50 pages.

Vidal et al., "Optimum watermark detection and embedding in digital images" Multimedia Signal Processing 1998 IEEE Second Workshop on 1998 pp. 285-290.

Cox et al., "Secure spread spectrum watermarking for multimedia" Image Processing IEEE Transactions on vol. 6 Issue 12 Dec. 1997 pp. 1673-1687.

George et al., "Digital watermarking of images and video using direct sequence spread spectrum techniques" Electrical and Computer Engineering 1999 IEEE Canadian Conference.

Boneh, "Collusion-secure fingerprinting for digital data" Information Theory IEEE Transactionon vol. 44 Issue 5 Sep. 1998 pp. 1897-1905.

Hartung et al., "Fast public-key watermarking of compressed video"Proceedings Interantional Conference on Image Processing 26-29 Ocv. 1997 pp. 528-531 vol. 1.

Yee et al., "A Virtual Reality Interface to an Enterprise Metadatabase", SpringerLink Contemporary, Conceptual Modeling-ER'97, 1997. pp. #1-pp. #14.

* cited by examiner

COLLUSION-RESISTANT WATERMARKING AND FINGERPRINTING

RELATED APPLICATIONS

This application is a continuation of and claims priority to U.S. patent application Ser. No. 09/841,159, filed Apr. 23, 2001, now U.S. Pat. No. 7,047,413, the disclosure of which is incorporated by reference herein.

TECHNICAL FIELD

This invention generally relates to a technology facilitating rights enforcement of digital goods using watermarks. This invention further generally relates to a fingerprinting technology for protecting digital goods by detecting collusion as a malicious attack and identifying the participating colluders.

BACKGROUND

"Digital goods" is a generic label for electronically stored or transmitted content. Examples of digital goods include images, audio clips, video, multimedia, software, and data. Digital goods may also be called a "digital signal," "content signal," "digital bitstream," "media signal," "digital object," "object," and the like.

Digital goods are often distributed to consumers over private and public networks—such as Intranets and the Internet. In addition, these goods are distributed to consumers via fixed computer readable media, such as a compact disc (CD-ROM), digital versatile disc (DVD), soft magnetic diskette, or hard magnetic disk (e.g., a preloaded hard drive).

Unfortunately, it is relatively easy for a person to pirate the pristine digital content of a digital good at the expense and harm of the content owners—which includes the content author, publisher, developer, distributor, etc. The content-based industries (e.g., entertainment, music, film, etc.) that produce and distribute content are plagued by lost revenues due to digital piracy.

Modem digital pirates effectively rob content owners of their lawful compensation. Unless technology provides a mechanism to protect the rights of content owners, the creative community and culture will be impoverished.

Watermarking

Watermarking is one of the most promising techniques for protecting the content owner's rights of a digital good. Generally, watermarking is a process of altering the digital good such that its perceptual characteristics are preserved. More specifically, a "watermark" is a pattern of bits inserted into a digital good that may be used to identify the content owners and/or the protected rights.

Generally, watermarks are designed to be completely invisible or, more precisely, to be imperceptible to humans and statistical analysis tools.

A watermark embedder (i.e., encoder) is used to embed a watermark into a digital good. A watermark detector is used to extract the watermark from the watermarked digital good. Watermark detection is performed in real-time even on small devices.

Those of ordinary skill in the art are familiar with conventional techniques and technology associated with watermarks, watermark embedding, and watermark detecting.

Watermarks have limitations. They may be used to designate a digital good as protected and, perhaps, to indicate that a license is necessary to legally use the digital good. However, since watermarks are identical in all copies of a digital good, a digital pirate can reproduce the original content of a marked copy by breaking the watermark at a single watermark detector, for example by extracting the detection key and using it to find the watermark and remove it or jam it.

Therefore, others may use the original content without the watermark; thus, without the content owner receiving the appropriate compensation. This is generally called "break once run everywhere" or BORE.

Furthermore, to individualize a particular copy of a digital good (or a particular system that will use that good) with watermarks, we need to augment it with a technology called "fingerprinting".

Conventional Fingerprinting

Conventional fingerprinting (i.e., "classic fingerprinting") refers to techniques that involve uniquely marking each copy of a particular digital good, and associating each uniquely marked copy with a "classic fingerprint." That classic fingerprint is associated with or assigned to a particular entity (e.g., person, business, media player, or smart card) to which the copy is distributed.

If unauthorized copies of the uniquely marked copy are made, the fingerprint can be traced back to the original entity to which the copy was initially distributed. In other words, classic fingerprinting technology may be used to trace piracy to its origin.

As an example, consider a printed map. When a mapmaker produces a map, they may want to ensure that those individuals to whom the map is distributed do not make unauthorized copies of the map and distribute them to others. One way that the mapmaker might protect his maps is to introduce a different trivial error (e.g., a non-existent street) into each of the copies of the map that are distributed. Those different trivial errors are fingerprints. Each fingerprint is then associated with an individual to whom the map is distributed. By associating each different fingerprint with a different individual, if and when unauthorized copies of that individual's copy are uncovered, they can be traced back to the original individual by virtue of the unique fingerprint that the map contains.

Using embedding methods similar (but not identical) to watermarking, the fingerprint is embedded into a digital good. If we want to achieve both prevention and "after the fact" tracing, a combination of the fingerprint and watermark are embedded into a digital good.

Very powerful machines that can devote significant resources to the process of detecting a fingerprint typically perform fingerprint detection. If necessary, a fingerprint detector can have access to the original unmarked digital good, using it to improve the likelihood of success in detecting the fingerprints—even from content modified by malicious attacks.

Classic Fingerprint=Unique Entity Identifier (UEid)

Although the term "fingerprint" is commonly understood by those of ordinary skill in the art, the terms "classic fingerprint" or "unique entity identifier" (UEid) may be used hereinafter to refer to this conventional technology (and its unique marks). This is done to avoid confusion with the use, herein, of "fingerprinting" in the other sections of this document (i.e., sections other than the "Background" section). In those other sections, the term "fingerprinting" may refer to a similar, but distinctly different technology.

Collusion

One problem with fingerprinting can arise when two or more entities collude. Their purpose for doing this may be to discover, modify, or remove their fingerprints and/or the embedded watermark. Those that attempt to collude are called "colluders." A group of colluders who attempt to collude are part of a "collusion clique."

Returning to the map example for illustration, collusion occurs when two or more individuals get together and compare their maps. They can, given enough time, ascertain their unique fingerprints by simply looking for the differences between their maps. If they can ascertain their fingerprint, they can alter it and therefore possibly avoid detection.

With the advent of the Internet and electronic distribution, fingerprinting digital goods for purposes of detecting or deterring unauthorized copying has become particularly important. As in the above map example, collusion by different individuals in the digital context can pose challenges to the owners and distributors of digital goods.

Conventional Fingerprinting/Watermarking Systems with Collusion Resistance

Existing conventional fingerprinting/watermarking systems have some capability for collusion detection. However, the protection offered by these systems is limited.

For example, Ergun et al. have proved that no conventional fingerprinting system can have a better asymptotical collusion-resistance than: $O((N/\log(N))^{1/2})$— where O indicates "order of magnitude" and N is the size of the marked digital good. For example, the best fingerprinting system today, "the Improved Boneh Shaw System" achieves for a typical two hour movie a collusion resistance of only 40 users. This system, just as the original "Boneh Shaw Fingerprinting System" has collusion resistance in the order of $O(N^{1/4})$.

The derivation of the upper bound on fingerprinting mechanisms by Ergun et al. considers embedding distinct fingerprints per copy of a digital good and models collusion attacks as averaging of copies with additive noise. Aspects of their work are described in an article entitled "A Note on the Limits of Collusion-Resistant Watermarks," authored by Ergun, Kilian, and Kumar, appearing in *Proc. Eurocrypt*, 1999.

For example, another conventional fingerprinting system (the "Boneh-Shaw, or B-S system") defines a lower bound on collusion-resistant fingerprinting: $O(N^{1/4})$. Assuming that the marked digital good is a typical music clip, the lower bound of the number of colluders necessary to thwart this conventional system is in the neighborhood of 4. The B-S system is a fingerprinting system that attempts to overcome the problem of collusion when fingerprinting digital goods. Aspects of the B-S system are described in an article entitled "Collusion-Secure Fingerprinting for Digital Data" authored by Boneh and Shaw, appearing in *IEEE Transactions on Information Theory*, Vol. 44, No. 5, September 1998.

Those of ordinary skill in the art are familiar with conventional techniques and technology associated with classic fingerprinting, classic fingerprinting embedding, and classic fingerprinting detecting.

Although the conventional fingerprinting systems provide some protection against collusion, that protection is only effective when the number of colluders is relatively small. Consequently, the confidence level that a marked digital good is free from the effects of collusion is not high.

Accordingly, there is a need for a new watermarking/fingerprinting technology that is more collusion resistant. A new technology is needed that increases the protection that is provided by fingerprinting (and watermarking) to detect colluders even when their numbers are large. If that numbers is several orders of magnitude greater than the conventional, then the confidence level—that a marked digital good is free from the effects of collusion—would be very high indeed.

Moreover, there needs to be a more effective technique to identify that a digital good has had its mark removed and who removed that mark. That way, piracy crimes can be more effectively investigated.

SUMMARY

Described herein is a technology facilitating rights enforcement of digital goods using watermarks. Also described herein is a fingerprinting technology for protecting digital goods by detecting collusion as a malicious attack and identifying the participating colluders. With this technology, digital goods are protected by a mechanism that detects collusion and colluders. In other words, with this technology, digital goods are protected by identifying that a digital good has had its mark removed and who removed that mark. That way, piracy crimes can be more effectively investigated.

At least one implementation of the technology, described herein, is characterized by limited BORE-resistance at the protocol level. (BORE is "break once, run everywhere.") If a digital pirate breaks one client and enables this client to avoid watermark detection, all content (both marked/protected an unmarked/free) can be played as unmarked only on that particular client. However, to enable other clients to play content as unmarked, the digital pirate needs to collude the extracted detection keys from many clients in order to create content that can evade watermark detection on all clients.

At least one implementation, described herein, significantly improves collusion resistance through a fingerprinting mechanism that can identify the members of a malicious coalition even when their numbers are several orders of magnitude greater than what conventional collusion-protection schemes can accomplish. Consequently, the confidence level—that a marked digital good is free from the effects of collusion—may be very high indeed. Each watermark detection key is distinct for all clients and thus contains a fingerprint associated with its corresponding client. The adversary coalition colludes their keys to create the optimal estimate of the embedding watermark. However, in this scenario each member of the malicious coalition leaves a fingerprint in every digital good from which the estimated watermark is subtracted Since, with this technology, a watermark detector uses its assigned "fingerprint" (as part of the secret detection key) to detect a watermark embedded in a digital good, an digital pirate (or group of such pirates) leaves her "fingerprint" when she removes (or modifies) the embedded watermark. Thus, like a burglar without gloves, the digital pirate leaves her fingerprints when she commits a crime.

Unlike conventional fingerprinting technologies, the technology described herein does not mark each copy of the content individually. The pirate marks the content when committing the crime.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific exemplary details. In other instances, well-known features are omitted or simplified to clarify the description of the exemplary implementations of present invention, thereby better explain the present invention. Furthermore, for ease of understanding, certain method steps are delineated as separate steps; however, these separately delineated steps should not be construed as necessarily order dependent in their performance.

The following description sets forth one or more exemplary implementations of Collusion-Resistant Watermarking and Fingerprinting that incorporate elements recited in the appended claims. These implementations are described with specificity in order to meet statutory written description, enablement, and best-mode requirements. However, the description itself is not intended to limit the scope of this patent.

The inventors intend these exemplary implementations to be examples. The inventors do not intend these exemplary implementations to limit the scope of the present invention. Rather, the inventors have contemplated that the present invention might also be embodied and implemented in other ways, in conjunction with other present or future technologies.

An example of an embodiment of Collusion-Resistant Watermarking and Fingerprinting may be referred to as an "exemplary collusion resister."

Incorporation by Reference

The following co-pending patent applications are incorporated by reference herein:

U.S. patent application Ser. No. 09/437,713, entitled "Methods and Systems for Fingerprinting Digital Data" filed on Oct. 28, 1999, and assigned to the Microsoft Corporation;

U.S. patent application Ser. No. 09/316,899, entitled "Audio Watermarking with Dual Watermarks" filed on May 22, 1999, assigned to the Microsoft Corporation; and U.S. patent application Ser. No. 09/614,660, entitled "Improved Stealthy Audio Watermarking" filed on Jul. 12, 2000, assigned to the Microsoft Corporation.

Introduction

Figure 5:
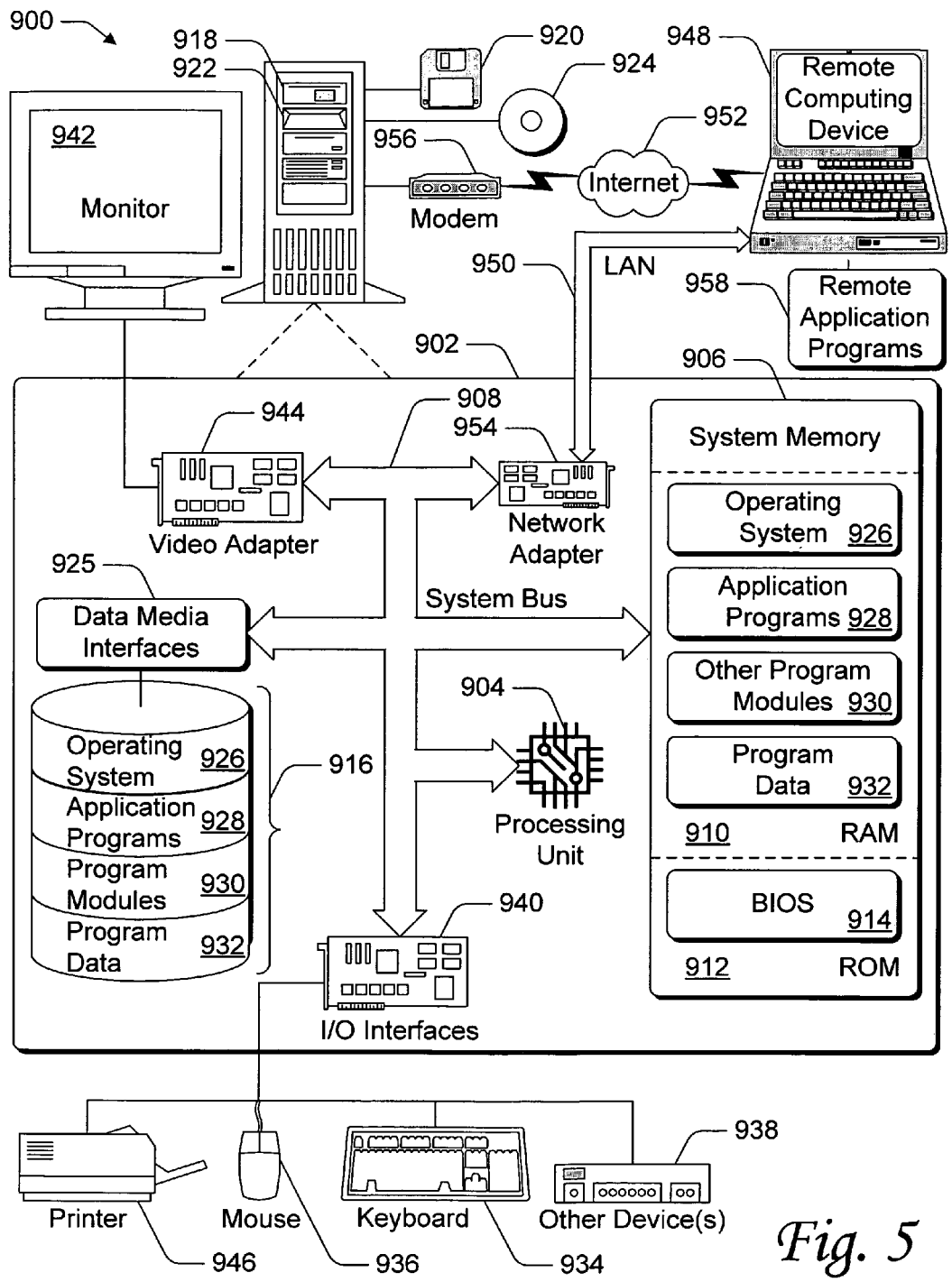
FIG. 5 is an example of a computing operating environment capable of implementing an implementation (wholly or partially) of the invention herein.

The one or more exemplary implementations, described herein, of the present invention may be implemented (in whole or in part) by a collusion-resistant architecture 100 and/or by a computing environment like that shown in FIG. 5.

One problem with fingerprinting can arise when two or more entities collude. Their purpose for doing this may be to discover, modify, or remove their fingerprints and/or the embedded watermark. Those that attempt to collude are called "colluders." A group of colluders is called a "collusion clique."

The exemplary collusion resister is generally BORE-resistant at the protocol level. (BORE is "break once, run everywhere.") By breaking a single client (i.e., detection entity), the digital pirate can play content as non-marked on that broken client, but needs to collude with others (other clients or other pirates who have broken into clients) to finally create content that can evade watermark detection on all clients. The exemplary collusion resister significantly improves collusion resistance through a fingerprinting mechanism that can identify the members of a collusion clique if its cardinality (i.e., number of members) is smaller than a relatively large lower bound. That relatively large lower bound is several orders of magnitude greater than the best that can be achieved by conventional systems.

Although the term "fingerprint" is commonly understood by those of ordinary skill in the art, the terms "classic fingerprint" or "unique entity identifier" (UEid) may be used hereinafter to refer to this conventional technology (and its unique marks). This is done to avoid confusion with the use, herein, of "fingerprinting" in the descriptions of one or more implementations of the present invention. In those descriptions, the term "fingerprinting" may refer to a similar, but distinctly different technology. More specifically, the fingerprint of those descriptions operates in a manner that is more analogous to the metaphor of forensic investigation. It is more like gathering evidence for a crime scene investigation. More specifically, it is more like gathering fingerprints to help identify and catch a criminal.

Overview

One or more implementation of the exemplary collusion resister, described herein, limits the scope of possible collusion attacks, when compared to classic fingerprinting systems. Under optimal attacks, the size of the collusion necessary to remove the marks without leaving a detectable fingerprint is asymptotically K~O(N) without segmentation, and $\kappa_s$~O(N log(N)) with segmentation (where N denotes object size, K is collusion resistance per segment, and $\kappa_s$ is the cumulative collusion resistance across segments).

Classic fingerprinting has a lower bound on collusion resistance that is roughly $O(N^{1/4})$. Thus, by using the exemplary collusion resister, one can achieve content protection with collusion resistance of up to 100,000 users for a two-hour high-definition video, for example.

Generally, the exemplary collusion resister is part of a combined watermarking/fingerprinting ("WM/FP") technology for dramatically improved collusion resistance. The improvement in collusion resistance is by several orders of magnitude over the conventional. With the conventional approaches, it may require, for example, a handful to a few dozen colluders to effectively remove the watermark without detection. With the exemplary collusion resister, it may require, for example, a hundred thousand (100,000) colluders to effectively remove the watermark without detection.

Unlike conventional fingerprinting, the fingerprints are not embedded in the digital good in at least one implementation of the exemplary collusion resister. Rather, they are assigned to (or associated with) a "client." A client may be called a "detection entity" because it is an entity that may detect a watermark. Examples of a detection entity include a person, company, or other business entity. Alternatively, a "detection entity" may be a specific copy of an application (e.g., a media player), a hardware devices, or some combination. More specifically, the fingerprints are assigned to a watermark detector (WMD). In that implementation, the watermark detector uses its assigned a secret detection key—that key includes the fingerprint used to detect the watermark. The detection key is different from the embedding key. By gaining the knowledge of a small number of detection keys (through collusion or other means), a pirate cannot remove the marks from the protected digital good.

Herein, it is assumed that the watermarking is robust against signal-processing attacks on the protected digital good. The exemplary collusion resister focuses on resisting collusion attacks against the detection keys. With the exemplary collusion resister, a pirate who has access to one detection key may be able to fool the watermark detector that corresponds to that one detection key, but cannot fool other detectors. In addition, in that process, the pirate necessarily inserts a fingerprint in the modified digital good.

Since the detector uses its fingerprint (as part of the detection key) to detect a watermark, an attacker (or group of such attackers) leaves her fingerprint when she removes (or modifies) the watermark. Thus, like a burglar without gloves, an attacker leaves fingerprints when she commits a crime. This also is unlike conventional fingerprinting.

With at least one implementation of the exemplary collusion resister, without segmentation the minimum collusion size (K) grows linearly with the size (N) of the marked digital good.

With at least one implementation of the exemplary collusion resister, a marked digital good is partitioned into segments. Each segment is marked with a different watermark. There are S segments. The watermark of each segment is associated with a single fingerprint (or alternatively a small plurality of fingerprints). Consequently, the watermark of each segment may only be detected by a single detector (or alternatively a small plurality of detectors) using its detection key. This segmentation is unlike conventional fingerprinting.

Only colluders with detection keys that belong to the same segment can participate in a collusion clique on that segment. Colluders with keys belong to differing segments will be of no benefit to each other (unlike in conventional FP). With segmentation, the minimum collusion size K grows as O(N log N), where N is object size.

Therefore, with or without segmentation, the exemplary collusion resister significantly improves on the best conventional asymptotic resistance to fingerprint collusion attacks of $O(N^{1/4})$ of the B-S system (see the Background section).

In at least one implementation of the exemplary collusion resister, the detection keys used to detect the watermarks are potentially, relatively large. Although the key size is relatively small with respect to the entire bulk of the digital good (which can reach up to 1-2 terabytes for raw uncompressed high definition video), the size of the detection key can still be inconveniently large especially for small embedded devices (approximately in the range of 1 KB). Therefore, the fingerprint is compressed in a sense. More specifically, smaller detection keys are generated during the detection key creation that approximately but correctly correlates with a specific embedded watermark.

Traditional Spread-Spectrum Watermarking

A media signal (i.e., a digital good) to be watermarked $x \in R^N$ can be modeled as a random vector, where each element of x is a normal random variable with standard deviation A (i.e., $x_j \sim \mathcal{N}(0, A)$). For example, for audio signals A ranges typically within $A \in \{5,15\}$, after necessary media preprocessing steps.

A "watermark key" w is defined as a spread-spectrum sequence vector $w \in (\pm 1)^N$, where each element $w_j$ is usually called a "chip." The marked signal y is created by vector addition y=x+w.

Let w·v denote the normalized inner product of vectors w and v (i.e. $w \cdot v \equiv N^{-1} \Sigma w_j v_j$, with $w^2 \equiv w \cdot w$. For example, for w as defined above we have $w^2 = 1$. We assume that the client (e.g., a media player) contains a watermark (WM) detector that receives a modified version ŷ of the watermarked signal y. The WM detector performs a correlation (or matched filter) test $d_w = \hat{y} \cdot w$, and decides that the watermark is present if $d_w > \delta_w$, where $\delta_w$ is the detection threshold that controls the tradeoff between the probabilities of false positive and false negative decisions.

Under no malicious attacks or other signal modifications (i.e. ŷ=y), if the signal y has been marked, then $d_w = 1 + g_w$, where the "detection noise" $g_w$ is a normal zero-mean random variable with variance $\sigma^2_g w = A^2/N$. Otherwise, the correlation test yields $d_w = 0 + g_w$. For equal probabilities of false positives and false negatives, we should set $\delta_w = \frac{1}{2}$. For robustness against attacks, the signal domain x are appropriately chosen, and some small modifications on the watermark pattern may be necessary.

For the purpose of describing implementations of the present invention, it is assumed that such precautions have been taken care of in the design of the WM detector, so such attacks are disregarded. For an overview of techniques that use this paradigm for hiding data in audio, images, and video, see "Information Hiding Techniques for Steganography and Digital Watermarking," Katzenbeisser and Petitcolas, Eds., Boston, Mass.: Artech House 2000.

Traditional spread-spectrum watermarking systems detect watermarks using a key w that is in essence a secret watermarking key (SWK). Typically, in many rights enforcement schemes, the watermark detection is done at the client (e.g., a media player), which must then have access to the SWK. An adversary (e.g., a digital pirate) can thus recreate the original content if they succeed in obtaining the SWK. For example, if a pirate breaking into a detector, she may recover/discover the SWK. Armed with this information, the digital pirate may recreate the original digital good which is not protected and thus, can be used and distributed as "free unprotected" content.

Exemplary Collusion-Resistant Architecture

In the exemplary collusion resister, the watermark detection key (WDK) is different from the secret watermarking key (SWK) of traditional watermarking. Consequently, breaking into a single detector does not provide the pirate enough information to remove the watermark w.

Figure 1:
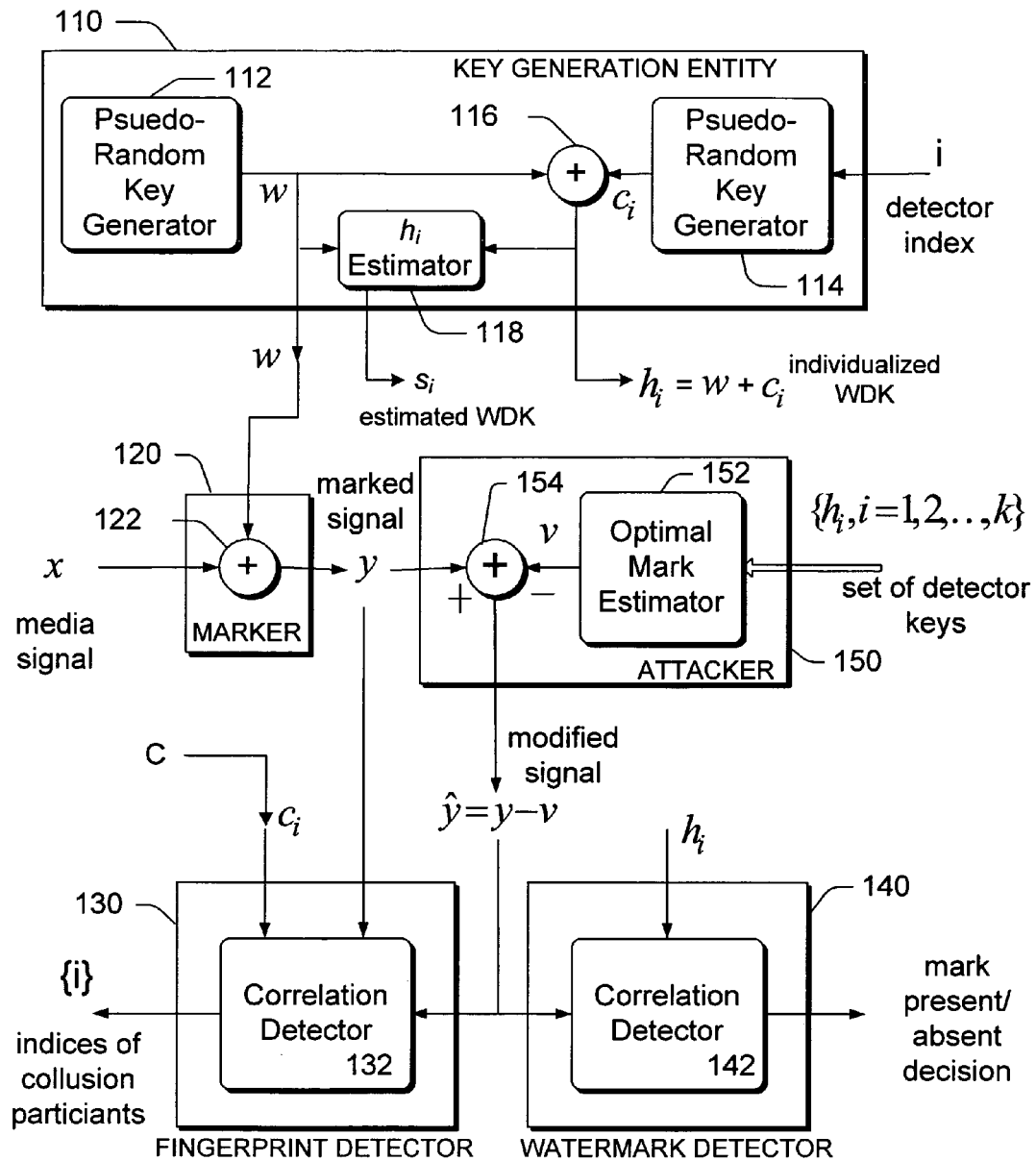
FIG. 1 is a schematic block diagram showing an architecture in accordance with an implementation of the invention herein and representation of an attack on a digital good.

FIG. 1 illustrates the collusion-resistant architecture 100. The architecture includes a key generations entity 110, marker 120, fingerprint detector 130, and watermark detector 140. Although FIG. 1 also shows an attacker 150, the attacker, of course, is not part of the architecture. However, their actions are anticipated by this architecture.

FIG. 1 illustrates the key generation entity 110. It includes a pseudorandom key generator (PRKG) 112 for pseudorandomly generating the SWK w. This SWK w is combined (at 122) with the media signal x (i.e., the digital good) by the marker to produce the marked signal y (i.e., marked digital good). This marked signal y is publicly distributed by the content owners. To this extent, the media signal x (in FIG. 1, x is input into marker 120) may be watermarked in much the same manner as in traditional spread-spectrum watermarking.

However, in addition to generating the watermarked, the key generation entity 100 generates an individualized "watermark carrier" ($c_i$) for each detector i (alternatively, for each client i). More specifically, a pseudorandom key generator (PRKG) 114 generates $c_i$. That watermark carrier $c_i$ is combined (at 116) with the SWK w to produce an individualized watermark detection key (WDK $h_i$).

Thus, for each watermark detector i (for example, the watermark detector 140 of FIG. 1), an individualized watermark detection key (WDK $h_i$) is created. That individualized key ($h_i$) is created from the SWK w. An example of a manner in which $h_i$ is created from the SWK w is as follows:

Let $C=\{c_{ij}\}$ denote an m×N matrix, where $c_{ij} \in R$, $c_{ij} \sim \mathcal{N}(0, B)$). In other words, each entry is a zero-mean normal random variable with standard deviation $\sigma_c$=B.

Each row i contains a "watermark carrier," denoted by $c_i$. The ith WDK is defined as $h_i = w + c_i$.

The purpose of the watermark carrier ($c_i$) is to hide the SWK w in $h_i$ so that knowledge of $h_i$ does not imply knowledge of w, as long as B is large enough. In other words, no detector contains the SWK w, but rather a modified version of it. No conventional technique does this.

The key generation entity 110 produces at least two "keys," and they include SWK w and $h_i$.

Because the watermark detectors use correlation-based watermark detection, they can still detect the watermark in a marked content y, as long as the number of chips N is large enough to attenuate the noise introduced by the watermark carriers $c_i$.

The watermark detection process (by, for example, that watermark detector 140 of FIG. 1) is carried out by correlating the received signal $\hat{y}$ (which may be modified) with $h_i$. This $h_i$ (being used by this detector) is the individualized WDK assigned to the detector doing the detection. More generally, the individualized WDK is assigned to a "client," which is a person, company, or other business entity. Alternatively, a "client" may be a specific copy of an application (e.g., a media player).

The watermark detector generates a detector output $d_W = \hat{y} \cdot h_i$. This is labeled "mark present/absent decision" in FIG. 1. Similar to traditional spread-spectrum watermarking, if $\hat{y}$ was marked, then $d_W = 1 + g_W$; otherwise $d_W = 0 + g_W$. The difference is that now $g_W$ is a function of both the media x and the watermark carrier $c_i$. If there are no attacks (i.e., $\hat{y} = y$) then:

$$d_W = y \cdot h_i = (x+w) \cdot (w+c_i) = 1 + g_W, \text{ where}$$

$$g_W = x \cdot (w+c_i) + w \cdot c_i$$

from which is computed the detection noise variance as $\sigma^2_{g_W} = (A^2 + B2 + A^2B^2)/N$.

FIG. 1 shows the watermark detector (WMD) 140. As described above, the WMD 140 correlates (with a correlation detector 142) a potentially marked signal $\hat{y}$ with individualized WDK $h_i$ (i.e., $d_W = \hat{y} \cdot h_i$). Again, that individualized WDK $h_i$ is specifically associated with the WMD 140. More particularly, it may be associated with a client.

The WMD 140 decides that the content of the potentially modified digital good is marked if $d_W > \delta_W$. The probability of false positives (i.e., identifying an unmarked content as marked) is denoted as $\epsilon_1$, which should be very small. (e.g., $\epsilon_1 = 10^{-9}$).

FIG. 1 shows the attacker 150. Although this illustrates only one attacker, it represents one or more attackers with many individualized WDKs. In other words, this attacker engages in a collusion attack. Regardless, the attacker—whether alone or working with others—is considered a colluder, herein, because it is a collusion attack using multiple WDKs.

The attacker 150 breaks into K clients. This may be accomplished by physically breaking into the client's machines (e.g., code debugging, reverse engineering, etc.) or by using a sensitivity attack. Once in, the attacker 150 extracts their individualized WDKs $\{h_i, i=1,\ldots K\}$. The attacker creates an attack vector v as an optimal estimate of the SWK w given the collusion set $\{h_i, i=1,\ldots K\}$. This estimate is the product of an optimal mark estimator 152 of the attacker 150. Furthermore, the attacker creates (with a signal combiner 154) an attacked signal $\hat{y} = y - v$. The closer v estimates w, the more that attacker will "clean" the watermark in generating $\hat{y}$.

The symbol $\epsilon_2$ will denote the probability that a watermark chip is incorrectly estimated by the attacker (i.e., $e_2 = \Pr[v_j \neq w_j]$). The attacker aims at forcing $\epsilon_2$ as small as possible. In the exemplary collusion resister, the system parameters are designed such that $\epsilon_2$ is as close to ½ as possible.

FIG. 1 shows the fingerprint detector (FPD) 130. It recovers the attack vector v from an attacked content $\hat{y}$ and the originally marked content y by $v = \hat{y} - y$. Unlike the WMD (like WMD 140), the FPD 130 has access to the watermark carrier matrix C. Thus, the FPD 130 correlates v (with a correlation detector 132) with a suspect watermark carrier $c_i$ (i.e., it computes $d_F = v \cdot c_i$) and decides that the ith client is part of the collusion if $d_F > \delta_F$ (i.e., $\delta_F$ is the FPD threshold). Compared to the WMD, the FPD has less noise in the correlated vectors, and thus the FPD collusion resistance is much higher than that of the WMD.

The symbol $\epsilon_3$ will denote the probability of false positives in the FPD (i.e., incriminating a client that was not in the collusion set). Therefore, $\epsilon_3$ should be very small.

Collusion Attacks on Detection Keys

Consider a collusion clique of size K that acquired K different WDKs $h_i$ (possibly, by breaking into K clients and extracting the WDKs). This collusion clique may include only one attacker with K different WDKs. Alternatively, it may include multiple attackers with K different WDKs For the purpose of describing collusion attacks, an optimal attack is based on that set of keys $\{h_i, i=1,\ldots K\}$. Without loss of generality, it is assumed that those extracted WDKs (with indices 1 to K) are the ones in the collusion.

The Optimal Attack

The attacker's goal is to estimate the SWK key w by an attack vector v, so that the modified signal $\hat{y} = y - v$ will not show significant correlation with any watermark detector j (i.e., ever for j>K). The best job that attacker can possibly perform is given by $v = \text{sign}(\Sigma_{i=1}^K h_i)$.

WMD Performance

Given the optimal attack above, the average estimation error in the attack vector ($\epsilon_2 = \Pr[v_j \neq w_j]$) may be computed, for a collusion of size K, by:

$$\varepsilon_2 = \frac{1}{2}\text{erfc}\left(\frac{\sqrt{K}}{B\sqrt{2}}\right) < \frac{1}{2}\exp\left(-\frac{K}{2B^2}\right) \quad (1)$$

Given $\epsilon_2$, the efficiency of a subtraction attack ($\hat{y} = y - v$) may be evaluated for the optimal attack vector v. Since $E[v \cdot w] = \Pr[v_j = w_j] - \Pr[v_j \neq w_j] = 1 - 2\epsilon_2$, one can see that after attack the expected output of the watermark correlation detector drops to $E[d_w] = 2\epsilon_2$. The attacker may attempt a stronger subtraction attack, of the form $\hat{y} = y - \beta v$, with $\beta > 1$, because that would bring the watermark detector output further down to $E[d_w]=2\beta\epsilon_2-(\beta-1)$. As long as $\beta$ is not too large, the attacked content $\hat{y}$ may be acceptable to users.

Collusion Size

In order to reduce the correlation value to $E[d_w]=\theta$, where $\theta$ is typically much smaller than $\delta_W$, the adversary (i.e., digital pirate, attacker, etc.) needs to collude K WDKs, with $$K = 2B^2\left[erf^{-1}\left(\frac{1-\theta}{\beta}\right)\right]^2 \quad (2)$$

To make the attacker's job more difficult, the parameter B is increased since K grows with $B^2$. B is the standard deviation of the watermark carrier c. In doing so, however, the detection noise variance is increased. The detection noise variance is $\sigma^2_{gW}=(A^2+B2+A^2B^2)/N$, where A is the standard deviation of the original content x and N is the size of the digital good. For a given $\sigma^2_{gW}$, we can determine that the probability of false positives $\epsilon_1=Pr[d_w>\delta_W|$ object is not marked] by:

$$\varepsilon_1 = \frac{1}{2}\text{erfc}\left(\frac{\delta_W\sqrt{N}}{\sqrt{2(A^2+B^2+A^2B^2)}}\right) < \quad (3)$$
$$\frac{1}{2}\exp\left(-\frac{\delta_W^2 N}{2(A^2+B^2+A^2B^2)}\right)$$

We note that if $\rho^2_{gW}=\frac{1}{2}$, then $\epsilon_1$ is also the probability of false negatives (i.e., the probability of a WMD not detecting a marked object that was not attacked.)

From the result above, the object size N required to achieve a given $\epsilon_1$ is $$N = \frac{2[A^2+B^2(1+A^2)]}{\delta_W^2}[erf^{-1}(1-2\varepsilon_1)]^2 \quad (4)$$

By combining the result above with that in Lemma 3, we conclude that the collusion size K grows linearly with object size N (i.e., K~O(N)). More specifically:

$$K = N\frac{\delta_W^2}{1+A^2}\left[\frac{erf^{-1}\left(\frac{1-\theta}{\beta}\right)}{erf^{-1}(1-2\varepsilon_1)}\right]^2 \quad (5)$$

Equation 5 allows for quick computation of the object size N necessary to achieve any desired collusion resistance K.

Fingerprint Detection

Fingerprint detection (such as by fingerprint detector (FPD) 130 of FIG. 1) has less noise in its correlation output. Therefore, it should be able to identify the indices i corresponding all the WDKs $h_i$ used in the collusion by the attacker, even if the collusion size K is large enough to fool all clients, as computed above.

The FPD knows the marked content y, the attacked version $\hat{y}$, and the watermark carriers $c_i$. It computes the correlation $d_F=(\hat{y}-y)\cdot c_i$, and decides that the ith client participated in the collusion if $d_F>\delta_F$. Assuming the attack model of discussed previously, $\hat{y}=y-\beta v$, the FPD output can be written as:

$$d_F(\hat{y}-y)\cdot c_i=\beta(v\cdot c_i)=E[d_F]+g_F \quad (6)$$

where $g_F$ is the zero-mean FPD correlation noise. The most critical error for the FPD is a false positive (i.e., incriminating a WDK i that did not participate in the collusion). The probability $\epsilon_3$ of that error is given, for an object of size N, by:

$$\varepsilon_3 = \frac{1}{2}\text{erfc}\left(\frac{\delta_F\sqrt{N}}{\sqrt{2}\beta B}\right) < \frac{1}{2}\exp\left(-\frac{\delta_F^2 N}{2\beta^2 B^2}\right) \quad (7)$$

As expected, $\epsilon_3 \ll \epsilon_1$ (usually by several orders of magnitude), since the argument in erfc($\cdot$) for $\epsilon_3$ is approximately $(A\delta_F)/(\beta\delta_W)$ times larger than the argument in erfc($\cdot$) for $\epsilon_1$. Thus, by choosing B and N for a sufficiently low $\epsilon_1$, a negligibly low probability $\epsilon_3$ of false positives in the FPD is achieved.

To compute the detection performance of the FPD, its expected output should be determined when a carrier $c_i$ is correlated such that $h_i$ was part of the collusion. It can be seen that $E[d_F]=\beta E[z_j]$, where:

$$z_j = v_j c_{ij} = \text{sign}[s_j]c_{ij}, \text{ with } s_j = w_j + b_j, \text{ and } b_j = \frac{1}{K}\sum_{m=1}^{K} c_{mj} \quad (8)$$

Thus, a collusion of size K produces:

$$E[d_F] = \beta\frac{B}{\sqrt{K}}\sqrt{\frac{2}{\pi}}\exp\left(-\frac{K}{2B^2}\right) \quad (9)$$

Given the expected FPD output, $\delta_F=E[d_F]/2$, which determines the probability $\eta$ of false negatives (i.e., the probability that a key index i in the collusion will not be detected). An object of size N produces:

$$\eta = \frac{1}{2}\text{erfc}\left(\frac{(E[d_F]-\delta_F)\sqrt{N}}{\sqrt{2}\beta B}\right) \quad (10)$$

From the results above, it can be computed that the object size N necessary to achieve a desired probability $\eta$ of false negatives in the FPD. For simplicity, assume that the FPD threshold is set in the middle (i.e., $\delta_F=E[d_F]/2$). The minimum collusion size (as discussed above) is $K=2B^2\mu^2$, where mu=erf$[\beta^{-1}(1-\theta)]$ is fixed for a fixed attack efficiency (i.e., a fixed $\theta$). Therefore, as B increases, the attacker has to increase K proportionally to $B^2$. The object size N required to achieve a given $\eta$ is $$N = K\frac{\pi}{2}[erf^{-1}(1-2\eta)\exp(\mu^2)]^2 \quad (11)$$

Segmentation

In the exemplary collusion resister, watermarks protect the content and fingerprints enable the content owner to identify a clique of clients that launched an attack to remove the watermark. This unique property of the implementation of the present invention provides an avenue to add multiple watermarks in the object (i.e., digital good) and enforce the adversary to create cliques independently for each watermark.

More formally, the exemplary collusion resister divides the protected object into S segments ($S_s$, s=1 ... S) and watermark each of them with a distinct spread spectrum sequence ($w_s$, s=1 ... S). Per each segment $S_s$, the exemplary collusion resister uses m distinct WDKs ($h_i^{[s]}$, i=1 ... m). Each client gets a single WDK $h_i^{[s]}$ that corresponds to exactly one segment. Alternatively, it may correspond to multiple segments.

With this segmentation implementation, a protected object may be defeated if watermarks are removed from all segments, while no fingerprints are introduced in the process. The collusion-resistance $\kappa_s$ of this segmentation implementation with S segments equals the expected number of clients needed to use their WDKs in S collusion cliques (a clique per segment) to defeat this segmentation implementation.

The probability q is the probability that after distributing $\kappa_s$ keys into segments, no segment contains less than K keys. Assume: S>>1, K is a relatively small constant, and $$\frac{\kappa_s}{SK} \gg 1.$$

Then: $\kappa_s = S[\ln(S)-\ln(2\epsilon_4)]$ then $q>1-\epsilon_4$.

Collectively, the key generation entity 110 and marker 120 of FIG. 1 perform the segmentation. Rather than redundantly embedding the same watermark in the media signal x, the key generation entity 110 and marker 120 embeds a watermark in each segment of the signal that are independent of the watermarks in other segments. Also, the key generation entity 110 generates a set of unique WDKs for each segment; whereas each WDK is associated only with the watermark embedded in the corresponding segment.

Of course, segments may be repeated within the signal. Therefore, when reference is made to "each" segment having unique or independent properties, this refers to unrepeated segments.

How Many Segments Per Object?

Since collusion resistance within a single segment is K~N, where $N=N_O/S$ is the length of the segment, and collusion resistance achieved over S segments is $\kappa_s=S \ln(S)$ for small K, then the objective is to have as short as possible segments in order to: (i) maximize overall collusion resistance $\kappa_s$ and (ii) reduce the storage space for a single WDK $H_i$.

On the other hand, due to security measures for hiding w within a watermark carrier $c_i$, there exists a lower bound on the watermark carrier amplitude B, commonly set to $B \geq A$. Selection of B uniquely identifies the segment length N with respect to a desired probability of a false alarm $\epsilon_1$ under the optimal sign (mean(h)) attack. Such a setup directly impacts the maximal collusion size per segment K and maximal efficacy of the adversary in guessing SWK bits $1-\epsilon_2$. It also traces the guidelines for FPD detection performance $\epsilon_3$ and $\eta$.

Key Compression

The exemplary collusion resister requires a relatively large storage space for the detection keys. Generally, it is quite difficult to compress the sum of two independent pseudo-random sequences, such that it is hard to infer the individual sequences. However, the exemplary collusion resister has a need to independently create pseudo-random keys (e.g., SWK w and watermark carrier $c_i$) in a secure environment, but store their sum (e.g., WDK $h_i$) in an insecure environment (e.g., on a client). Furthermore, this needs to be done so that the individual keys cannot be inferred from the sum.

Generally, a detection key (e.g., WDK $h_i$) may be about the size of the digital good itself. For realistic loads, the length of the detection key may be in the order of $10^5$ bytes, which may be too much data for certain embedded devices.

Above, it was described that the WDK of client i is created as $h_i=c_i+w$, where $c_i$ and w are mutually independent. Instead, the exemplary collusion resister can generate the watermark detection key from a short seed using any standard cryptographically secure pseudo-random key generator, and per chosen w do sieving and select only those seeds for which the resulting long sequence (denoted as s) has the property that $s \cdot w \geq 1$, thus, inferring $h_i = s$. The deviation of s·w is roughly $\sigma^* = B\sqrt{N_o}$, so the probability for a randomly chosen seed to meet this criterion is $$\varepsilon^* = \frac{1}{2}\text{erfc}(N_O/(B\sqrt{2})).$$

FIG. 1 shows an $h_i$ (individualized WDK) estimator 118 of the key generation entity 110 in FIG. 1. It generates a short-key estimation ($s_i$) for the individualized WDK ($h_i$). Consequently, $s_i \approx h_i$. In other words, the short-key estimation ($s_i$) of the individualized WDK is approximately equal to the individualized WDK ($h_i$).

Alternative Key Compression

The exemplary collusion resister may generate the key from a short seed using any standard cryptographically secure pseudorandom key generator, and per a chosen w do sieving and "pick" only those seeds for which the resulting long sequence (call it s) has the property that $s \cdot w > 2n/3$, say (recall that it must be bigger than the detection threshold $\delta_1 = n/2$).

The deviation of s·w is $\sigma^* = n^{1/2}B/2$, so the probability for a randomly chosen seed to meet this criteria is $\epsilon^* < \exp(-u^2/2)$, where $u\sigma^* = 2n/3$. So, $\epsilon^* < \exp(-n/B^2)$. This may not be sufficient for a whole object ($n=10^6$).

However, the exemplary collusion resister may do a piecewise generation by breaking the whole sequence into subsequences of size say $n'=20B^2$ elements, where each element is half a byte. So the length of each subsequence is 4n' bits. The exemplary collusion resister may try on the average $\exp(u^2/2)$ seeds until a good one (about a million in the above example) is found. Typically, this is done once per client.

If the exemplary collusion resister uses a random access PRNG, it may jump on the average $\exp(u^2/2)$ phases until a good one is found. A pointer of this magnitude has $\log \exp (u^2/2) = n'/B^2$ bits, so the compression ratio is $4B^2$. For example, for B=10, the exemplary collusion resister get compression ratio of 400. If $n=10^6$, then a detection key is a size 10 K byte per client.

This key can be stored on a smart card, for example. The key is good for a multitude of different goods (e.g., 800 movies) (the error probability in estimating w by averaging k movies is $\exp(-k/(8A^2))$.

Methodological Implementation of the Exemplary Collusion Resister

Figure 2:
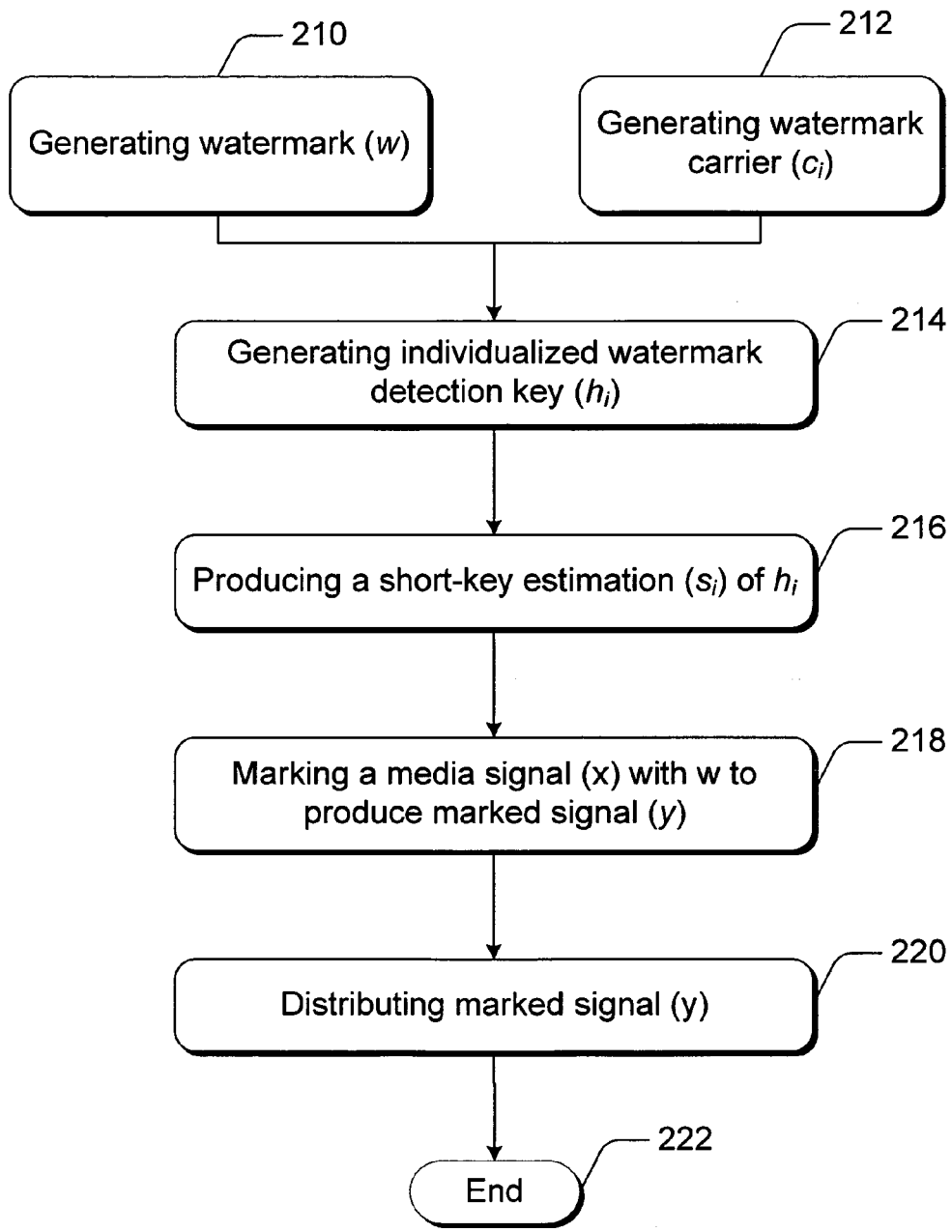
FIG. 2 is a flow diagram showing an illustrative methodological implementation (e.g., an embedding implementation) of the invention herein.
Figure 3:
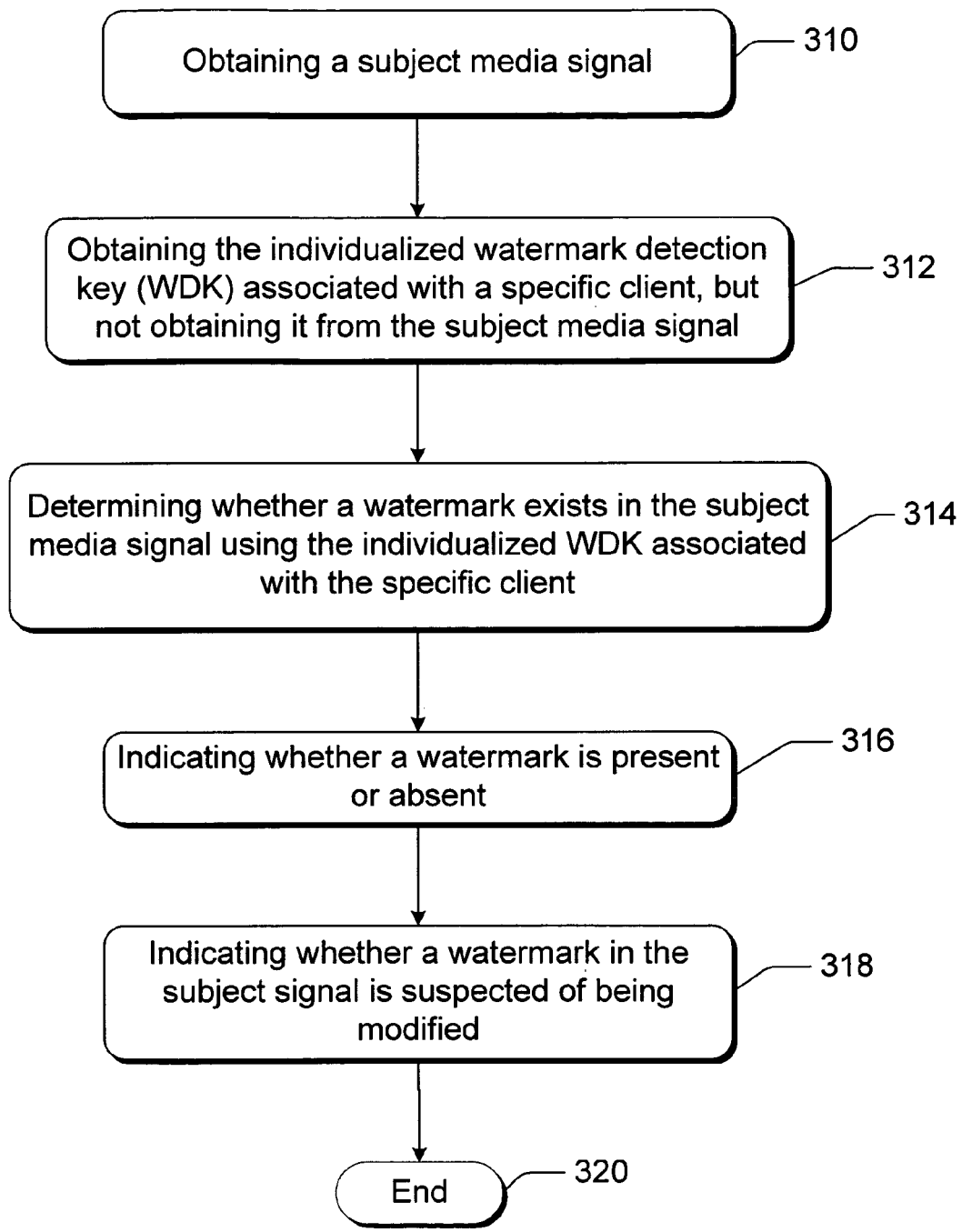
FIG. 3 is a flow diagram showing an illustrative methodological implementation (e.g., a detection implementation) of the invention herein.
Figure 4:
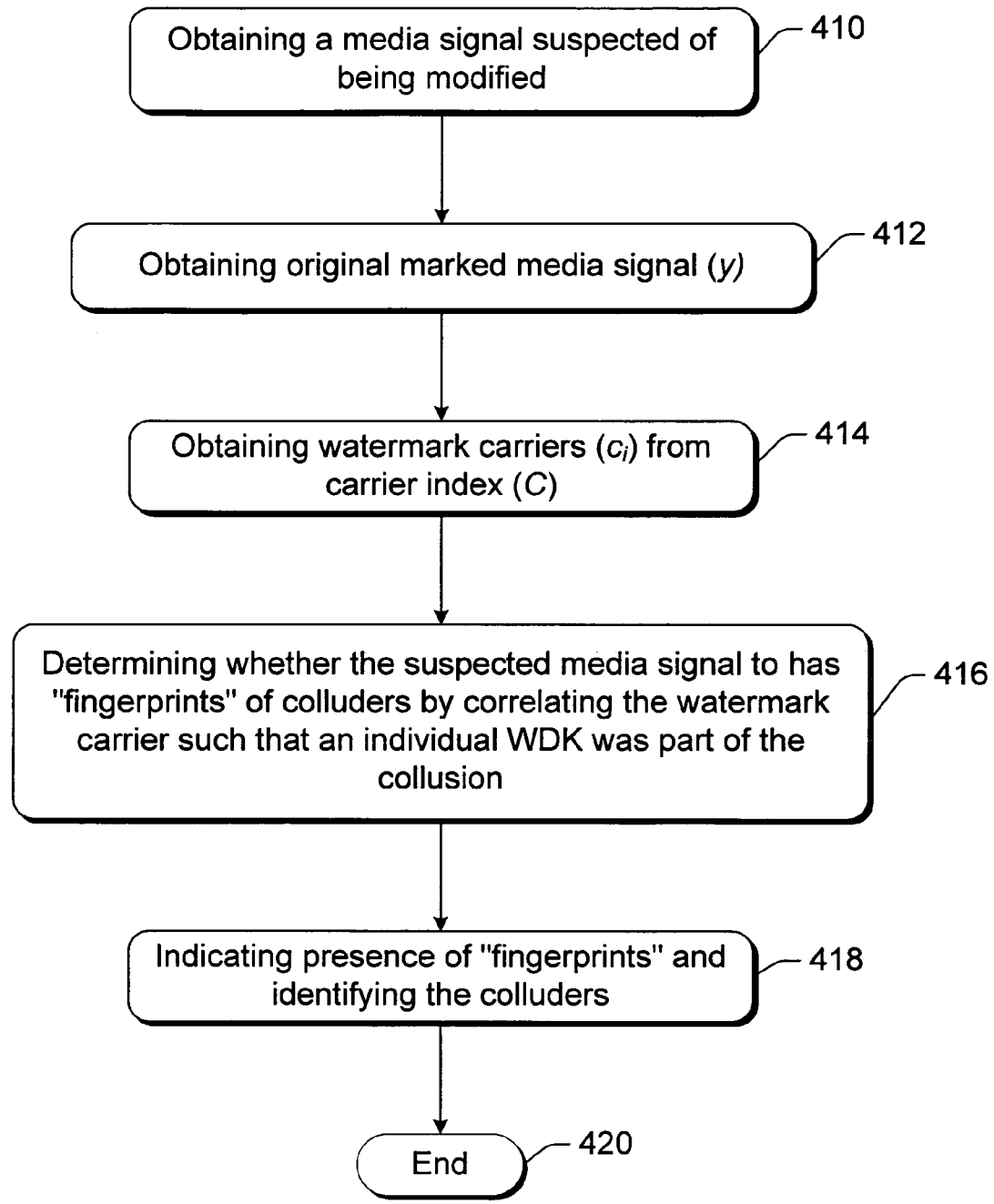
FIG. 4 is a flow diagram showing an illustrative methodological implementation (e.g., a fingerprint detection implementation) of the invention herein.

FIGS. 2-4 show methodological implementations of the exemplary collusion resister performed by the collusion-resistant architecture 100 (or some portion thereof). These methodological implementations may be performed in software, hardware, or a combination thereof.

FIG. 2 shows methodological implementation of the exemplary collusion resister performed by, for example, the key generation entity 110 and marker 120 of the collusion-resistant architecture 100.

At 210 of FIG. 2, the exemplary collusion resister generates a pseudorandom watermark w for embedding into a media signal x (i.e., a digital good).

At 212, it generates an individual pseudorandom watermark carrier $c_i$ where the carrier and the watermark are based on different seeds. In other words, one is not inferred from the other. Each carrier is associated with an individual client (e.g., person, business, company, detector hardware, detector software, etc.). The carriers are stored in a carrier matrix (C) and each entry in that matrix is associated with an individual client.

At 214, an individualized watermark detection key (WDK $h_i$) is generated by combining the watermark and an individual watermark carrier. Consequently, each individualized WDKs is associated with an individual client. At 216, the exemplary collusion resister produces a short-key estimation ($s_i$) of the individualized WDKs.

At 218 of FIG. 2, the media signal x is marked to produce a marked media signal y. In other words, y=x+w. At 220, the marked signal is distributed. The process ends at 222.

NOTE: No fingerprint is embedded into the media signal. Unlike classic fingerprinting, no fingerprint code is embedded into the signal. The WDKs are not embedded into the signal. The watermark carriers are not embedded into the signal. The marked signal includes the watermark, but it does not include a fingerprint.

However, since the individualized WDKs are generated in part by the watermarks, then only those clients having a particularly associated individualized WDK can access (detect, modify, etc.) the particularly associated watermark in the marked signal.

If no segmentation is employed, then these blocks 210-222 are repeated for each copy of a digital good. Each copy is associated with a specific client. That specific client is associated with the individualized WDK for that specific copy.

If segmentation is employed, then blocks 210-218 are repeated for each segment of the media signal x. Each segment has its own watermark embedded therein. Consequently, each segment also has an individualized WDK associated with it. If segmentation is employed, then the copy of the marked signal distributed in block 220 may be an identical for everyone. This is because clients can only access (detect, modify, etc.) watermarks in their associated segment.

FIG. 3 shows methodological implementation of the exemplary collusion resister performed by, for example, the watermark detector 140 of the collusion-resistant architecture 100.

Since watermark detection is typically done in an insecure environment, it has no access to the original unmarked signal (x), the original marked media signal (y), carrier index (C), and the like. Typically, watermark detection is performed in "real-time" by detectors (e.g., desktop hardware and/or software) with pedestrian computing power.

At 310 of FIG. 3, the exemplary collusion resister obtains a subject media signal. It is not known whether this signal has been modified or not. At 312, the individualized WDK associated with a specific client is obtained. The individualized WDK may be hardwired, it may be in firmware, it may be stored in a memory, or the like. It may be encrypted or hidden. Regardless of where the individualized WDK is obtained, it does not come from the subject media signal. The exemplary collusion resister does not obtain the individualized WDK from the signal that it is examining.

At 314, it determines whether a watermark exists in the subject media signal using the individualized WDK associated with the specific client. At 316, it indicates the results of such determination.

At 318, it indicates whether a watermark in the subject signal is suspected of being modified. If so, that may trigger the fingerprint detection (see FIG. 4). At 320, the process ends.

FIG. 4 shows methodological implementation of the exemplary collusion resister performed by, for example, the fingerprint detector 130 of the collusion-resistant architecture 100.

At 410 of FIG. 4, the exemplary collusion resister obtains a media signal suspected of being modified. At 412, it also obtains original marked media signal (y). At 414, it also obtains the watermark carriers ($c_i$) for carrier index (C).

Since fingerprint detection is typically done in a secure environment, it can have access to the original marked media signal and carrier index (C). Typically, fingerprint detection is performed "offline" by powerful computers with sufficient resources.

At 416 of FIG. 4, the exemplary collusion resister determines whether the suspected media signal to has "fingerprints" of colluders by correlating the watermark carrier such that an individual WDK was part of the collusion. At 418, it indicates the presences of "fingerprints" and identifies the colluders. At 420, the process end.

Exemplary Computing System and Environment

FIG. 5 illustrates an example of a suitable computing environment 900 within which an exemplary collusion resister, as described herein, may be implemented (either fully or partially). The computing environment 900 may be utilized in the computer and network architectures described herein.

The exemplary computing environment 900 is only one example of a computing environment and is not intended to suggest any limitation as to the scope of use or functionality of the computer and network architectures. Neither should the computing environment 900 be interpreted as having any dependency or requirement relating to any one or combination of components illustrated in the exemplary computing environment 900.

The exemplary collusion resister may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary collusion resister may be described in the general context of computer-executable instructions, such as program modules, being executed by a computer. Generally, program modules include routines, programs, objects, components, data structures, etc. that perform particular tasks or implement particular abstract data types. The exemplary collusion resister may also be practiced in distributed computing environments where tasks are performed by remote processing devices that are linked through a communications network. In a distributed computing environment, program modules may be located in both local and remote computer storage media including memory storage devices.

The computing environment 900 includes a general-purpose computing device in the form of a computer 902. The components of computer 902 can include, by are not limited to, one or more processors or processing units 904, a system memory 906, and a system bus 908 that couples various system components including the processor 904 to the system memory 906.

The system bus 908 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 902 typically includes a variety of computer readable media. Such media can be any available media that is accessible by computer 902 and includes both volatile and non-volatile media, removable and non-removable media.

The system memory 906 includes computer readable media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is stored in ROM 912. RAM 910 typically contains data and/or program modules that are immediately accessible to and/or presently operated on by the processing unit 904.

Computer 902 may also include other removable/non-removable, volatile/non-volatile computer storage media. By way of example, FIG. 5 illustrates a hard disk drive 916 for reading from and writing to a non-removable, non-volatile magnetic media (not shown), a magnetic disk drive 918 for reading from and writing to a removable, non-volatile magnetic disk 920 (e.g., a "floppy disk"), and an optical disk drive 922 for reading from and/or writing to a removable, non-volatile optical disk 924 such as a CD-ROM, DVD-ROM, or other optical media. The hard disk drive 916, magnetic disk drive 918, and optical disk drive 922 are each connected to the system bus 908 by one or more data media interfaces 925. Alternatively, the hard disk drive 916, magnetic disk drive 918, and optical disk drive 922 can be connected to the system bus 908 by one or more interfaces (not shown).

The disk drives and their associated computer-readable media provide non-volatile storage of computer readable instructions, data structures, program modules, and other data for computer 902. Although the example illustrates a hard disk 916, a removable magnetic disk 920, and a removable optical disk 924, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 916, magnetic disk 920, optical disk 924, ROM 912, and/or RAM 910, including by way of example, an operating system 926, one or more application programs 928, other program modules 930, and program data 932. Each of such operating system 926, one or more application programs 928, other program modules 930, and program data 932 (or some combination thereof) may include an embodiment of a digital-good obtainer, a fingerprint detector, a collusion indicator, a colluder identifier, a fingerprint memory, and a watermark detector.

A user can enter commands and information into computer 902 via input devices such as a keyboard 934 and a pointing device 936 (e.g., a "mouse"). Other input devices 938 (not shown specifically) may include a microphone, joystick, game pad, satellite dish, serial port, scanner, and/or the like. These and other input devices are connected to the processing unit 904 via input/output interfaces 940 that are coupled to the system bus 908, but may be connected by other interface and bus structures, such as a parallel port, game port, or a universal serial bus (USB).

A monitor 942 or other type of display device can also be connected to the system bus 908 via an interface, such as a video adapter 944. In addition to the monitor 942, other output peripheral devices can include components such as speakers (not shown) and a printer 946 which can be connected to computer 902 via the input/output interfaces 940.

Computer 902 can operate in a networked environment using logical connections to one or more remote computers, such as a remote computing device 948. By way of example, the remote computing device 948 can be a personal computer, portable computer, a server, a router, a network computer, a peer device or other common network node, and the like. The remote computing device 948 is illustrated as a portable computer that can include many or all of the elements and features described herein relative to computer 902.

Logical connections between computer 902 and the remote computer 948 are depicted as a local area network (LAN) 950 and a general wide area network (WAN) 952. Such networking environments are commonplace in offices, enterprise-wide computer networks, intranets, and the Internet.

When implemented in a LAN networking environment, the computer 902 is connected to a local network 950 via a network interface or adapter 954. When implemented in a WAN networking environment, the computer 902 typically includes a modem 956 or other means for establishing communications over the wide network 952. The modem 956, which can be internal or external to computer 902, can be connected to the system bus 908 via the input/output interfaces 940 or other appropriate mechanisms. It is to be appreciated that the illustrated network connections are exemplary and that other means of establishing communication link(s) between the computers 902 and 948 can be employed.

In a networked environment, such as that illustrated with computing environment 900, program modules depicted relative to the computer 902, or portions thereof, may be stored in a remote memory storage device. By way of example, remote application programs 958 reside on a memory device of remote computer 948. For purposes of illustration, application programs and other executable program components such as the operating system are illustrated herein as discrete blocks, although it is recognized that such programs and components reside at various times in different storage components of the computing device 902, and are executed by the data processor(s) of the computer.

Computer-Executable Instructions

An implementation of an exemplary collusion resister may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 5 illustrates an example of a suitable operating environment 900 in which an exemplary collusion resister may be implemented. Specifically, the exemplary collusion resister(s) described herein may be implemented (wholly or in part) by any program modules 928-930 and/or operating system 926 in FIG. 5 or a portion thereof.

The operating environment is only an example of a suitable operating environment and is not intended to suggest any limitation as to the scope or use of functionality of the exemplary collusion resister(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer Readable Media

An implementation of an exemplary collusion resister may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data digital good, such as carrier wave or other transport mechanism. Communication media also includes any information delivery media.

The term "modulated data signal" means a signal that has one or more of its characteristics set or changed in such a manner as to embedde information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the invention.

The invention claimed is:

1. A method facilitating the protection of digital goods, the method comprising:
generating a plurality of watermark detection keys, each including a corresponding watermark carrier;
marking a digital good with at least one watermark corresponding to the watermark detection keys, wherein the watermark carriers are not embedded in the digital good during marking with the watermark, wherein, when the watermark is modified or removed from the digital good using one or more of the watermark detection keys, one or more of the watermark carriers corresponding to the one or more watermark detection keys used to modify or remove the watermark are detected from examination of in the digital good;
distributing the digital good as a distributed digital good;
determining that the watermark in the distributed digital good has been modified or removed; and
identifying, by a detector implemented by a processor executing computer-executable instructions stored in computer-readable storage media, at least one of the watermark carriers by examination of the distributed digital good.

2. A method as recited in claim 1, further comprising:
associating the watermark detection keys with specific entities via the watermark carriers; and
identifying the specific entity associated with the identified at least one watermark carrier for determining a source of the one or more watermark detection keys used to modify or remove the watermark.

3. A method as recited in claim 1, wherein the digital good is partitioned into multiple segments that each include one of the watermarks, and wherein the determining examines one or more segments of the multiple segments of the digital good.

4. A method as recited in claim 1, wherein the determining that the watermark has been modified or removed includes comparing the digital good with an originally marked version of the digital good.

5. A method as recited in claim 1, wherein the digital good is selected from a group consisting of digitized images, digitized audio, digitized video, digitized multimedia, software applications, and media signals.

6. One or more computer-readable storage media comprising computer-executable instructions executed for performing acts comprising:
generating a plurality of watermark detection keys with corresponding watermark carriers, wherein for distribution of a digital good, the digital good is marked with at least one watermark corresponding to the watermark detection keys, wherein the watermark carriers are not embedded in the digital good during marking with the watermark, wherein, when the watermark is modified or removed from the digital good using one or more of the watermark detection keys, one or more of the watermark carriers corresponding to the one or more watermark detection keys used to modify or remove the watermark are detected from examination of the digital good;
following distribution of the digital good, determining that the watermark in the digital good has been modified or removed; and
identifying, by a detector implemented by a processor of a computer executing the computer-executable instructions, at least one of the watermark carriers by examination of the digital good when the watermark has been modified or removed.

7. One or more computer-readable storage media as recited in claim 6, wherein the watermark detection keys are compressed by producing a short key estimation of each watermark detection key for distribution to an assigned detection entity.

8. One or more computer-readable storage media as recited in claim 6, wherein the digital good is partitioned into multiple segments that each include one of the watermarks and determining examines one or more segments of the multiple segments of the digital good.

9. One or more computer-readable storage media as recited in claim 6, further comprising:
associating the individualized watermark detection keys with specific detection entities via the watermark carriers; and
identifying an associated detection entity from the identified at least one watermark carrier for determining a source of the one or more watermark detection keys used to modify or remove the watermark.

10. One or more storage media as recited in claim 6, wherein the digital good is selected from a group consisting of digitized images, digitized audio, digitized video, digitized multimedia, software applications, and media signals.

11. A system for facilitating the protection of digital goods, the system comprising:
a digital good having a watermark embedded therein;
a memory configured to store one or more watermark detection keys corresponding to the watermark, each watermark detection key including a corresponding watermark carrier, wherein, when the watermark is embedded in the digital good, the watermark carriers are not embedded in the digital good, wherein, when the watermark is modified or removed from the digital good using one or more of the watermark detection keys, one or more of the watermark carriers corresponding to the one or more watermark detection keys used to modify or remove the watermark are detected from examination of the digital good;
a watermark detector configured to determine that the embedded watermark has been modified or removed from the digital good; and
a fingerprint detector including one or more processors configured to identify at least one of the watermark carriers from an examination of the digital good when the watermark has been modified or removed.

12. A system as recited in claim 11, wherein the watermark detection keys are associated with specific entities via the watermark carriers, and wherein the fingerprint detector is configured to identify the specific entity associated with the identified at least one watermark carrier for determining a source of the one or more watermark detection keys used to modify or remove the watermark.

13. A system as recited in claim 11, wherein the watermark detection keys are compressed by producing a short key estimation of each watermark detection key for distribution to assigned detection entities.

14. A system as recited in claim 11, wherein the digital good is selected from a group consisting of digitized images, digitized audio, digitized video, digitized multimedia, software applications, and media signals.

15. A method for facilitating the protection of digital goods, the method comprising:
generating a plurality of individualized watermark detection keys, each including a corresponding unique watermark carrier associated therewith by combining a secret watermarking key with each unique watermark carrier;
marking a digital good by using the secret watermarking key for embedding at least one digital watermark in the digital good, wherein the at least one digital watermark corresponds to the individualized watermark detection keys, wherein the watermark carriers are not embedded in the digital good during marking of the digital good by embedding the digital watermark, wherein when the digital watermark is modified or removed from the digital good using a plurality of the individualized watermark detection keys during a collusion attack, one or more of the watermark carriers corresponding to the one or more watermark detection keys used to modify or remove the watermark are detected from examination the digital good;
associating each unique watermark carrier to a specific detection entity, whereby each detection entity includes a different individualized watermark detection key able to detect the watermark using correlation-based watermark detection;
distributing the digital good;
detecting that the embedded digital watermark has been modified or removed from an attacked version of the digital good that was distributed by comparing the attacked version of the digital good with an originally marked version of the digital good;
recovering, by a detector implemented by a processor executing computer-executable instructions stored in computer-readable storage media an attack vector that was used in a collusion attack to modify or remove the watermark from the digital good by examination of the attacked version of the digital good in comparison with the originally marked version of the digital good;
identifying, by the detector, a plurality of the watermark carriers from correlation with the attack vector recovered from the digital good, wherein the identified watermark carriers correspond to a plurality of the individualized watermark detection keys that were used in the collusion attack on the digital good; and
identifying, by the detector, specific detection entities as being associated with individualized watermark detection keys used in the collusion attack from the identified watermark carriers.

16. A method as recited in claim 15, wherein the watermark detection keys are compressed by producing a short key estimation of each watermark detection key for distribution to the specific detection entities.

17. A method as recited in claim 15, wherein the watermark carrier is used as part of the corresponding individualized watermark detection keys by the assigned detection entity when detecting the digital watermark in the digital good.

18. A method as recited in claim 15, wherein the digital good is selected from a group consisting of digitized images, digitized audio, digitized video, digitized multimedia, software applications, and media signals.

* * * * *